United States Patent [19]

Gualtier

[11] Patent Number: 5,085,462

[45] Date of Patent: Feb. 4, 1992

[54] AIRBAG AND VEHICLE HORN SWITCH ASSEMBLY

[76] Inventor: Quentin E. Gualtier, 16 Winding Way, North Caldwell, N.J. 07006

[21] Appl. No.: 546,565

[22] Filed: Jun. 29, 1990

[51] Int. Cl.⁵ .................. B60R 21/16; H01H 9/00
[52] U.S. Cl. ................................. 280/731; 200/61.54
[58] Field of Search ............. 200/61.54, 61.55, 61.56, 200/61.57, 61.58 R; 280/731-735

[56] References Cited

U.S. PATENT DOCUMENTS

| 3,718,791 | 2/1973 | Szablowski | 200/85 A |
| 4,325,568 | 4/1982 | Clark et al. | 200/61.55 X |
| 4,934,735 | 6/1990 | Embach | 280/731 |

Primary Examiner—J. R. Scott
Attorney, Agent, or Firm—Kenyon & Kenyon

[57] ABSTRACT

A horn switch and driver side airbag assembly for a motor vehicle has a lower contact integrally coupled to the top wall of the inner cover of an airbag module. The inner cover is adapted to receive the driver side airbag therein, and the top wall thereof is adpated to open outwardly when the airbag is deployed to permit the airbag to pass therethrough. An outer cover is fitted over the inner cover, and an upper contact is integrally coupled to a flexible wall of the outer cover. The flexible wall is adapted to open outwardly when the airbag is deployed to permit the airbag to pass therethrough. The upper and lower contacts thus remain securely coupled to the outer and inner covers, respectively, when the airbag is deployed and, therefore, avoid striking a passenger in the vehicle. The upper contact is spaced above the lower contact and adapted to contact the lower contact and, in turn, actuate the horn switch, by urging the flexible wall of the outer cover toward the inner cover.

34 Claims, 8 Drawing Sheets

AIRBAG AND VEHICLE HORN SWITCH ASSEMBLY

FIELD OF THE INVENTION

The present invention relates to vehicle horn switches and to driver side airbags and, in particular, to horn switch and driver side airbag module assemblies.

BACKGROUND INFORMATION

Motor vehicle horn switch assemblies on vehicles without driver side airbags are typically mounted on a pad located on the center of the steering wheel and, accordingly, are often referred to as "horn pads". The horn pad is typically mounted on a plate supported above the hub on the center of the steering wheel. The location of horn pads has proven to be effective because it is easy for drivers to locate and operate the horn, especially during emergency situations. Also, because most motor vehicles have horn pads, it is habit for many drivers to reach for a horn pad on the center of the steering wheel to operate the horn. Accordingly, if the horn switch assembly is moved to a different location, drivers typically, at first, find it difficult to access and operate the horn quickly.

Figure 1:
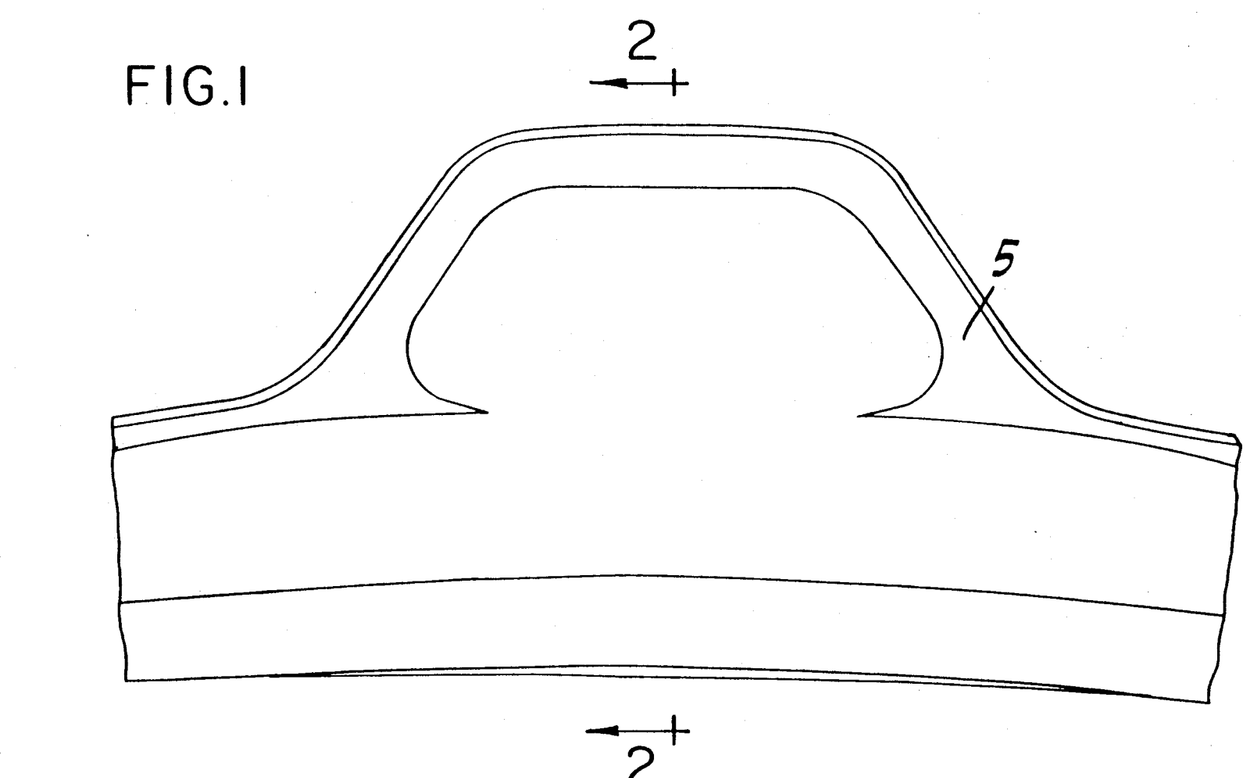
FIG. 1 is a top plan view of a typical vehicle horn pad, which is adapted to be mounted on the center of a steering wheel without a driver side airbag.
Figure 2:
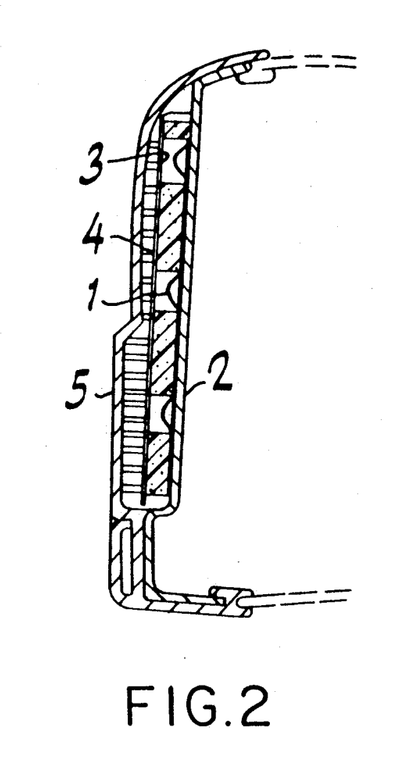
FIG. 2 is a cross-sectional view taken along the line 2—2 of FIG. 1, illustrating the typical horn pad of FIG. 1.

A typical horn pad for use without a driver side airbag is illustrated in FIGS. 1 and 2. The horn pad includes a lower metal contact 1, which is electrically coupled to the horn, mounted on a pad 2 supported above the steering wheel hub (not shown). An upper metal contact 3 is also electrically coupled to the horn, and spaced above the lower contact 1 by a foam spacer 4. The upper contact 3 is seated immediately below a horn switch cover 5. When the cover 5 is depressed, the upper contact 3 is moved into contact with the lower contact 1 and, thus, closes the circuit to operate the horn. Both contacts are typically located in a central area of the steering wheel beneath the cover 5, making the horn pad easily accessible for the driver.

Motor vehicles with driver side airbags typically do not have a horn pad, or other type of horn switch assembly mounted above the steering wheel hub on the center of the steering wheel. Rather, the driver side airbag is mounted within an airbag module supported above the hub on the center of the steering wheel. When a driver side airbag is deployed, it is inflated with pressurized gas. The inflated airbag then breaks through an inner cover and an outer cover of the airbag module, to protect the driver.

Accordingly, if a conventional horn pad were mounted on the center of an airbag module (i.e., in the center of the steering wheel), such as the horn pad described above, it would be forced loose by the inflated airbag. The rapid action of the airbag could cause the metal contacts (or other components of the horn pad) to strike and injure a passenger in the vehicle. The same problem is encountered if another type of vehicle component is mounted in the center of the steering wheel above the airbag module—when the airbag is deployed, the components would be rapidly forced loose by the airbag and, in turn, possibly injure a passenger in the vehicle.

Therefore, although a horn switch is typically easier to operate when mounted on the center of a steering wheel, vehicle manufacturers to date have not utilized this location for horn switch assemblies with driver side airbags, in order to avoid the risk of injuring passengers when the airbag is deployed. Indeed, vehicle manufacturers have avoided mounting any vehicle components in the center of a steering wheel above an airbag module, to avoid the risk of any such components injuring a passenger when the airbag is deployed.

As a result, horn switch assemblies are typically mounted to one side of the airbag module, and no vehicle components are mounted above the airbag module in the center of the steering wheel. Accordingly, when the airbag is deployed, the horn switch assembly is maintained in place, and, thus, the risk of it (or any other vehicle components) striking any passengers is avoided. However, a significant disadvantage of such horn switch assemblies is that they are more difficult to access and to operate rapidly, especially in comparison to a typical horn pad supported above the hub on the center of a steering wheel.

It is an object of the present invention, therefore, to overcome the problems encountered in mounting a horn switch assembly and/or other components on the center of a steering wheel above an airbag module, without the risk of injuring the driver or other passengers with the components thereof when the airbag is deployed.

SUMMARY OF THE INVENTION

The present invention is directed to an apparatus for operating a motor vehicle horn, wherein the motor vehicle has a driver side airbag supported within the steering wheel. The apparatus comprises an airbag module, including an inner cover supported above the hub of the steering wheel. The inner cover is adapted to receive the driver side airbag therein. The inner cover includes a first release portion adapted to open outwardly when the airbag is deployed, to permit the airbag to pass therethrough. The first release portion also remains securely coupled to the other portions of the inner cover, to prevent any portions thereof from striking a passenger in the vehicle when the airbag is deployed. A first contact of the apparatus is coupled to the first release portion of the inner cover. The first contact is thus prevented from being forced loose from the first release portion of the inner cover and, in turn, striking a passenger in the vehicle, when the airbag is deployed.

The apparatus further includes an outer cover fitted over the inner cover. The outer cover includes a flexible wall adapted to be urged toward the inner cover. The flexible wall includes a second release portion adapted to open outwardly when the airbag is deployed, to permit the airbag to pass therethrough. The second release portion also remains securely coupled to the other portions of the outer cover to prevent any portions thereof from striking a passenger in the vehicle, when the airbag is deployed.

A second contact of the apparatus is coupled to the first or second release portions of the inner cover and the outer cover, respectively. The second contact thus remains securely supported when the airbag is deployed to avoid striking a passenger in the vehicle. The second contact is supported above the first contact and adapted to contact the first contact, when the flexible wall of the outer cover is urged toward the inner cover, to actuate the apparatus and, in turn, operate the horn.

In one apparatus of the present invention, the first contact is integrally coupled to the inner cover and includes a plurality of first contact portions projecting upwardly therefrom. The first contact portions are adapted to contact the second contact upon the flexible wall being urged toward the inner cover. The second contact is integrally coupled to the flexible wall of the outer cover, and includes a plurality of second contact portions spaced above and facing the first contact portions. The second contact portions are adapted to contact the first contact portions, upon the flexible wall being urged toward the inner cover.

The apparatus preferably further comprises a resilient insulating member supported between the first contact and the second contact. The insulating member is squeezed upon the flexible wall being urged toward the inner cover, to permit the second contact portions to contact the first contact portions. The resilient insulating member defines a plurality of first apertures extending therethrough. Each first aperture is located between a respective first contact portion and second contact portion, to permit the contact portions to contact one another therein.

In one apparatus of the present invention, the inner cover includes a plastic material, the first contact includes metal, and the first contact is molded as an integral part of the inner cover. The first contact is located so that the first contact portions extend upwardly in the direction of the outer cover. The first contact includes a plurality of first lobes projecting outwardly from either side thereof. Each first lobe is adapted to integrally couple the first contact to the inner cover upon the molding thereof. The first contact further includes a plurality of first raised portions projecting upwardly therefrom. Each first raised portion defines a respective first contact portion on a surface thereof. Each first lobe preferably defines at least one second aperture extending therethrough. Each second aperture is adapted to permit the plastic material of the inner cover to flow therethrough upon the molding thereof and, thus, integrally couple the first contact to the inner cover.

The second contact is recessed within a surface of the flexible wall of the outer cover facing the inner cover, and coupled as an integral part thereof. The second contact includes a plurality of second lobes projecting outwardly from either side thereof. The second lobes are adapted to integrally couple the second contact to the outer cover. The second contact further includes a plurality of second raised portions projecting downwardly therefrom. Each second raised portion defines a respective second contact portion on a surface thereof. The outer cover preferably includes a plastic material, and the second contact preferably includes metal. Each second lobe defines at least one third aperture extending therethrough. The third apertures are adapted to permit the plastic material of the outer cover to flow therethrough upon the molding thereof, to integrally couple the second contact to the outer cover.

In another apparatus of the present invention, a flexible membrane extends across the top wall of the inner cover, and is securely coupled thereto. The second contact is securely coupled to a surface of the flexible membrane facing the inner cover, and is spaced above the first contact. A resilient insulating member is seated within a recess defined within the top wall of the inner cover. The first contact is integrally coupled to the inner cover within the recess, and oriented so that the first contact portions project upwardly therefrom toward the outer cover.

The insulating member is located between the first contact and the second contact, and includes a plurality of insulator apertures extending therethrough. Each insulator aperture is adapted to permit the first contact to contact the second contact therein, upon the flexible wall of the outer cover being urged toward the inner cover. The flexible membrane preferably includes an adhesive on a surface thereof. The adhesive is provided to securely couple the flexible membrane to the top wall of the inner cover, and to securely couple the second contact to the flexible membrane.

One advantage of the apparatus of the present invention, is that because the first contact is coupled to the first release portion of the inner cover, and the second contact is coupled to either the first or the second release portions of the inner cover and the outer cover, respectively, both contacts remain coupled thereto when the airbag is deployed. As a result, the risk of either component being forced loose when the airbag is deployed and, in turn, striking a passenger in the vehicle, is avoided.

Another advantage of the apparatus of the present invention, is that the components of the horn switch assembly (or other vehicle components) can be supported on the airbag module in the center of the steering wheel. Accordingly, the horn switch assembly is particularly convenient for a driver to access and to operate, especially during emergency situations.

Other advantages of the apparatus of the present invention will become apparent in view of the following detailed description and drawings taken in connection therewith.

DETAILED DESCRIPTION

Figure 3:
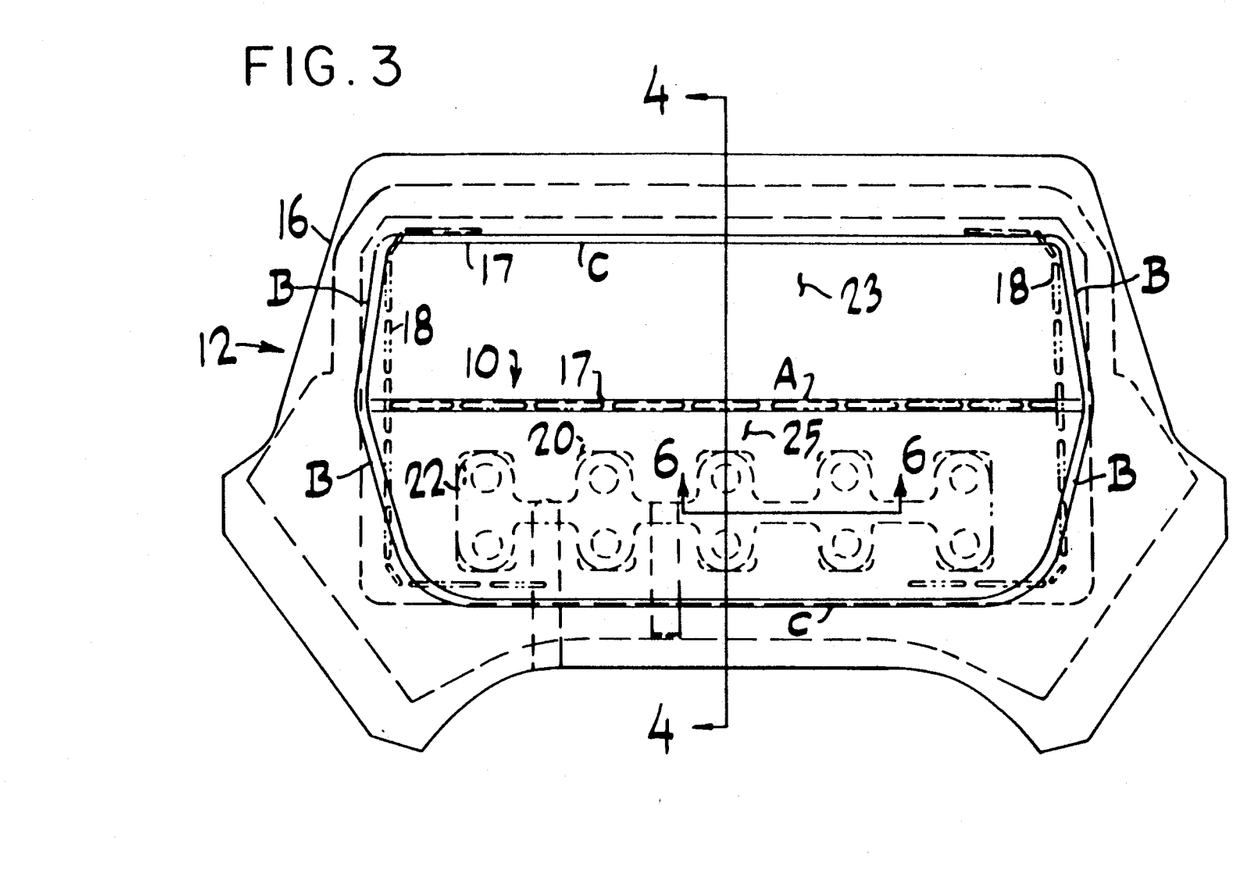
FIG. 3 is a top plan view of an apparatus embodying the present invention.
Figure 4:
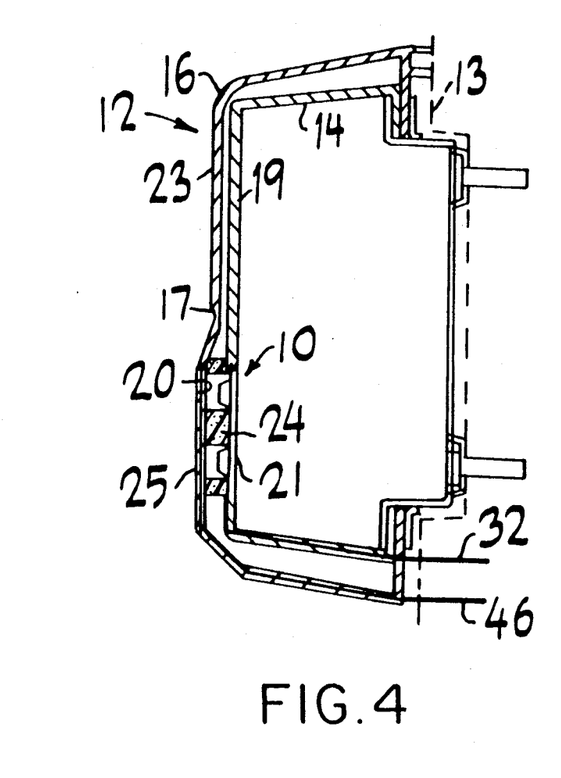
FIG. 4 is a cross-sectional view of the apparatus of FIG. 3, taken along the line 4—4 of FIG. 3.
Figure 5:
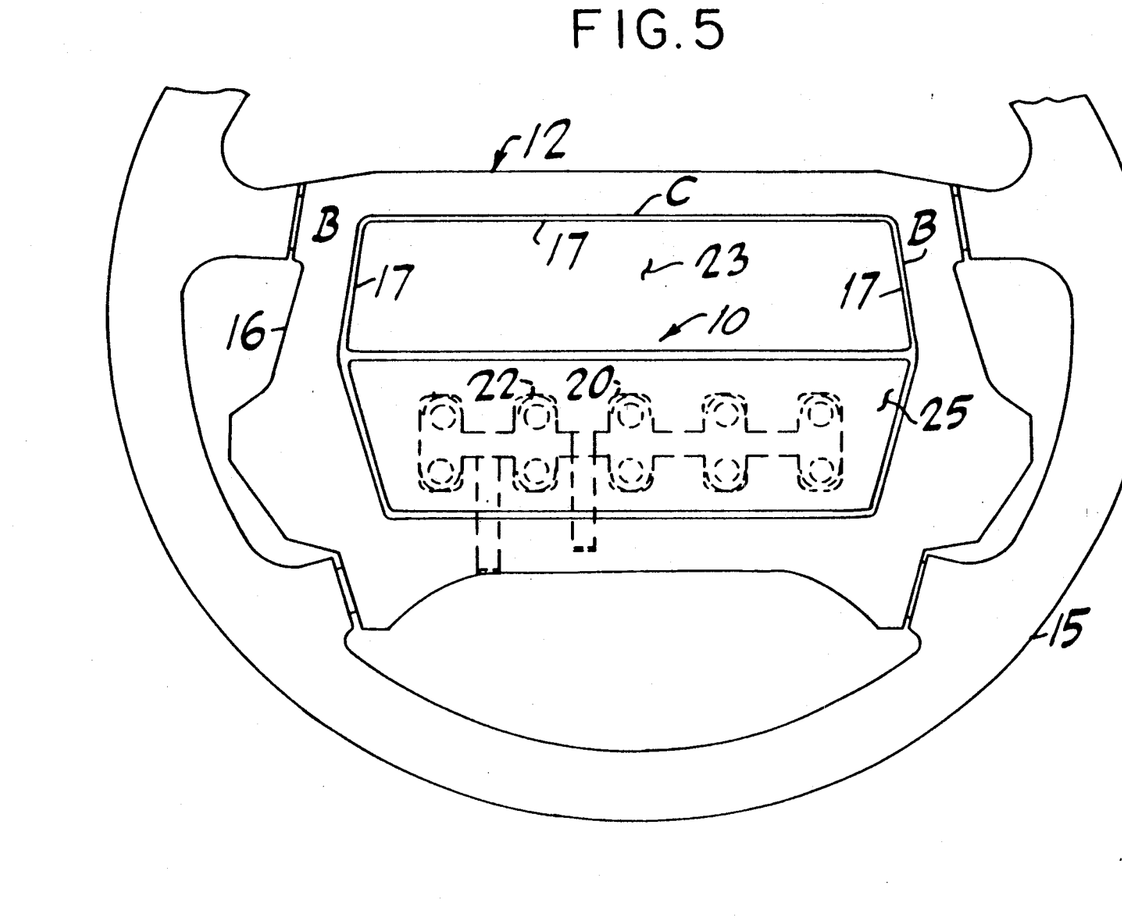
FIG. 5 is a top plan view of the apparatus of FIG. 3 shown mounted on the center of a steering wheel.

In FIG. 3, an apparatus embodying the present invention is shown including a horn switch assembly, indicated generally by the reference numeral 10, mounted within an airbag module, indicated generally by the reference numeral 12. The airbag module 12 includes an inner cover 14, and an outer cover 16 fitted over the inner cover 14, as shown in FIG. 4. The inner cover 14 is supported above the hub 13, illustrated schematically in phantom lines in FIG. 4. The hub 13 is supported in the center of a steering wheel 15, as shown in FIG. 5. The inner cover 14 is adapted to hold an airbag therein (not shown). The outer cover 16 is injection molded of a flexible plastic, such as PVC, and is shaped to be securely fitted over the inner cover 14. The inner cover 14 is injection molded of a rigid plastic, such as polypropylene.

The horn switch assembly 10 is mounted within the airbag module 12, and is actuated to operate the horn (not shown) by depressing the flexible outer cover 16, as described further below. As can be seen, the horn switch assembly 10 is not mounted to the side of the airbag module 12, as with most vehicles having driver side airbags, but rather is located in the central area of the steering wheel 15, and is thus easily accessible by a driver.

The top wall of the inner cover 14 has several perforated sections 18 formed therethrough, as illustrated in phantom lines in FIG. 3. The perforated sections 18 define a horizontal center line extending across the center of the inner cover 14 and two lines intersecting, and extending substantially perpendicular to that line, on either side of the inner cover 14. The top wall of the outer cover 16, on the other hand, defines a seam 17. The lines of the seam 17 approximately track the lines of the perforated sections 18, and include the lines A, B, and C. The seam 17 has a reduced cross-sectional thickness in comparison to the other areas of the outer cover 16, as shown in FIG. 4. The perforated sections 18 and the seam 17 are, accordingly, adapted to break-open when the airbag is deployed, to permit the airbag to pass therethrough.

The perforated sections 18 thus define a top central portion 19 and bottom central portion 21 of the inner cover 14, that open outwardly when the airbag is deployed. The seam 17 likewise defines a top central portion 23 and bottom central portion 25 of the outer cover 16, that open outwardly when the airbag is deployed.

Thus, when the airbag is deployed, the portions 19 and 21 fold outwardly, but remain securely coupled to the other portions of the inner cover 14 where they are not perforated. The portions 23 and 25 of the outer cover 16 open and fold outwardly along the lines A and B of the seam 17, but remain securely coupled to the other portions of the outer cover along the lines C thereof. Therefore, the portions 19, 21, 23 and 25 cannot be forced loose and, as a result, possibly strike and injure a passenger when the airbag is deployed.

The horn switch assembly 10 of the present invention is, in turn, securely coupled to the bottom central portions 21 and 25 of the inner cover 14 and outer cover 16, respectively, as described further below. Therefore, when the airbag is deployed, the risk of any components of the horn switch assembly 10 being forced loose and, in turn, striking and injuring a passenger is avoided.

Figure 6:
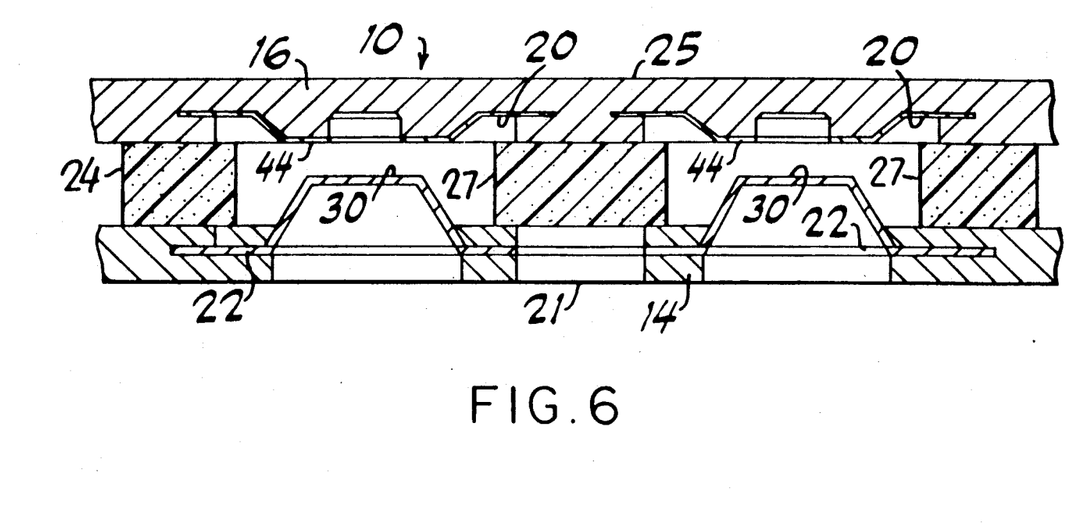
FIG. 6 is a magnified, partial cross-sectional view of the apparatus FIG. 3, taken along the line 6—6 of FIG. 3.

In FIG. 6, the horn switch assembly 10 is shown comprising an upper contact 20, molded as an integral part of the outer cover 16, and a lower contact 22, molded as an integral part of the inner cover 14. A urethane foam insulator 24 is seated between the outer cover 16 and the inner cover 14 and, thus, is also seated between the upper contact 20 and the lower contact 22. The foam insulator 24 defines several apertures 27 extending therethrough, each being located to permit the upper contact 20 to engage the lower contact 22 therein. The thickness of the foam insulator 24 is dimensioned so that when the outer cover 16 is not depressed, the upper contact 20 is maintained spaced above the lower contact 22, as shown in FIG. 6.

The horn switch assembly 10 is actuated by depressing the outer cover 16 so that the upper contact 20 contacts the lower contact 22, whereupon the electric horn circuit (not shown) is closed to operate the horn. When the driver releases the cover 16, the resiliency of both the urethane foam insulator 24 and outer cover 16 causes the upper contact 20 to be carried upwardly and back into the position shown in FIG. 6, to disconnect the horn.

As shown in FIGS. 3 and 6, the upper contact 20 is molded as an integral part of the bottom surface of the outer cover 16 in the bottom central portion 25 thereof. The lower contact 22 is molded as an integral part of the top wall of the inner cover 14, in the bottom central portion 21 thereof. Accordingly, when the airbag is deployed, the bottom central portion 25 of the outer cover 16, which is integrally coupled to the upper contact 20, opens outwardly to permit the airbag to pass therethrough, but is maintained securely coupled to the other portions of the outer cover along the lines C of the seam 17. The bottom central portion 21 of the inner cover 14, which is integrally coupled to the lower contact 22, is likewise forced outwardly by the airbag to permit the airbag to pass therethrough. However, it also remains securely coupled to the other portions of the inner cover 14 where the perforated sections 18 do not exist.

Therefore, when the airbag is deployed, the upper contact 20 and the lower contact 22, both remain securely coupled to the outer cover 16 and the inner cover 14, respectively. Accordingly, the risk of any components of the horn switch assembly 10 being forced loose upon the deployment of the airbag and striking a passenger in the vehicle, is avoided.

Figure 7:
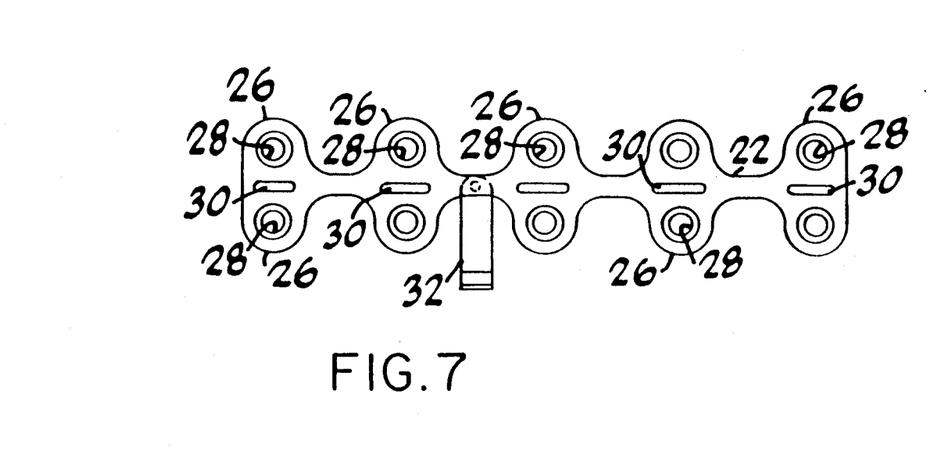
FIG. 7 is a top plan view of the lower contact of the apparatus of FIG. 3.
Figure 8:
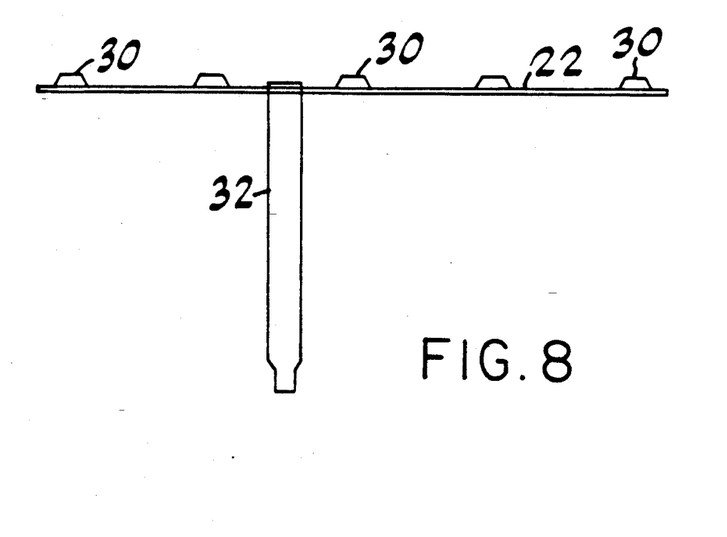
FIG. 8 is a side plan view of the upper contact of FIG. 7.

In FIGS. 7 and 8, the lower contact 22 is shown comprising a plurality of lobes 26 spaced apart from each other and projecting outwardly from either side thereof. Each lobe 26 has formed therethrough an aperture 28. The apertures 28 are adapted to permit the polypropylene of the inner cover 14 to flow therethrough when molded, and thus integrally couple the lower contact 22 thereto. The lower contact 22 further comprises several raised contact portions 30, each being located between two opposing lobes 26.

As shown in FIG. 6, the lower contact 22 is located within the top wall of the inner cover 14 so that the raised contact portions 30 project upwardly therefrom. Each contact portion 30 extends into a respective aperture 27 of the foam insulator 24, and is accordingly adapted to engage a corresponding portion of the upper contact 20 to operate the horn. A male contact member 32 extends outwardly from the lower contact 22. The male contact member 32 is provided to electrically couple the lower contact 22 to the other components of the horn circuit, in a manner known to those skilled in the art. The lower contact 22 is preferably made of tin plated steel, approximately 0.014 inches thick.

Figure 9:
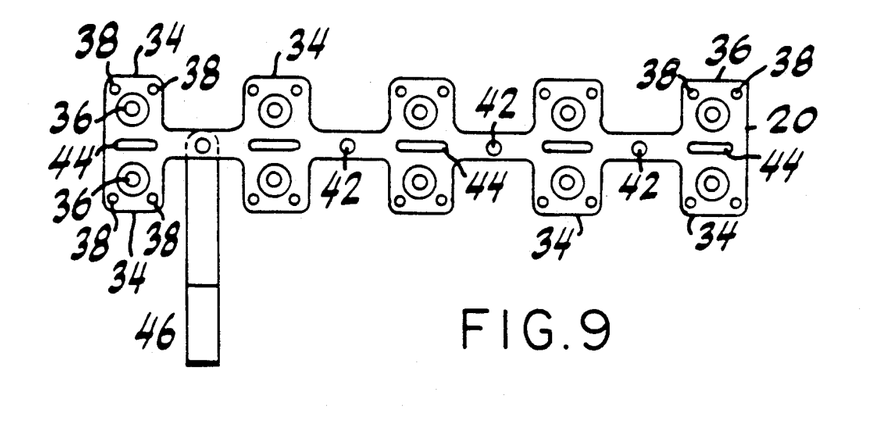
FIG. 9 is a top plan view of the upper contact of the apparatus of FIG. 3.
Figure 10:
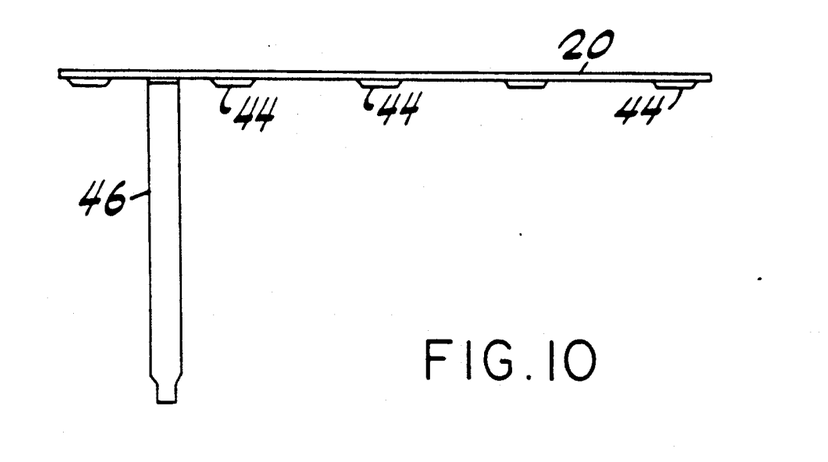
FIG. 10 is a side plan view of the upper contact of FIG. 9.

In FIGS. 9 and 10, the upper contact 20 is shown comprising a plurality of lobes 34 projecting outwardly from either side thereof. Each lobe 34 has formed therethrough a first aperture 36, and two second apertures 38. A plurality of third apertures 42 also extend through the upper contact 20, each being located between two pairs of adjacent lobes 34. The first apertures 36, second apertures 38, and third apertures 42, are provided to permit the PVC of the outer cover 16 to flow therethrough when the outer cover is molded, to integrally couple the upper contact 20 thereto. The upper contact 20 further includes a plurality of raised contact portions 44, each being located between two opposing lobes 34 and projecting upwardly therefrom. A male contact 46 extends outwardly from the upper contact 20, and is provided to electrically couple the upper contact to the other components of the horn circuit, in a manner known to those skilled in the art. The upper contact 20 is preferably made of phosphor bronze, approximately 0.005 inches thick.

As shown in FIG. 6, the upper contact 20 is recessed within the bottom surface of the outer cover 16 and oriented so that the contact portions 44 project downwardly therefrom. The lowest surfaces of the contact portions 44 are located in substantially the same plane as the bottom surface of the outer cover 16. Each contact portion 44 is located above a respective aperture 27 in the foam insulator 24, and thus above a respective raised contact portion 30 of the lower contact 22. The contact portions 44 are, accordingly, adapted to contact the contact portions 30 when the outer cover 16 is urged toward the inner cover 14, to operate the horn.

In the operation of the apparatus of the present invention, the horn switch assembly 10 is operated by depressing the outer cover 16 so that the raised portions 44 of the upper contact 20 contact the raised portions 30 of the lower contact 22. Once there is contact between the upper contact 20 and lower contact 22, the electric circuit is closed and, therefore, electric current is permitted to pass therethrough to operate the horn. When the driver releases the outer cover 16, the foam insulator 24 and the flexible outer cover 16 carry the upper contact 20 upwardly and back into the position shown in FIG. 6, to disconnect the horn.

In FIGS. 11 through 14, another apparatus embodying the present invention is illustrated, and includes a horn switch assembly, indicated generally by the reference numeral 110, and an airbag module, indicated generally by the reference numeral 112. The horn switch assembly 110 and airbag module 112 are both substantially similar to the horn switch assembly 10 and airbag module 12 described above in relation to FIGS. 3 through 10. Therefore, like reference numerals are used to indicate like elements, with the exception that the reference numerals in FIGS. 11 through 14 are preceded by the numeral 1. And, accordingly, only those components of the horn switch assembly 110 and airbag module 112 that are different than the corresponding components of the horn switch assembly 10 and airbag module 12 described above, are hereinafter described.

Figure 11:
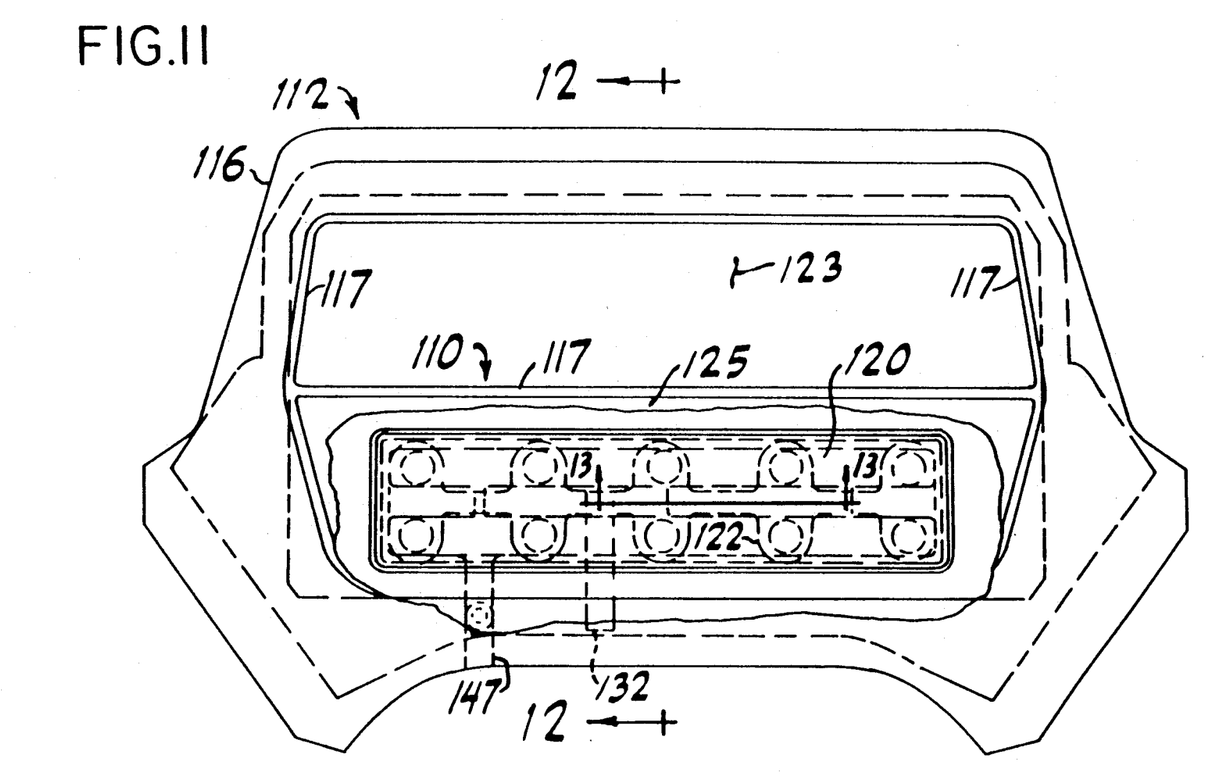
FIG. 11 is a top plan view of another apparatus embodying the present invention.
Figure 12:
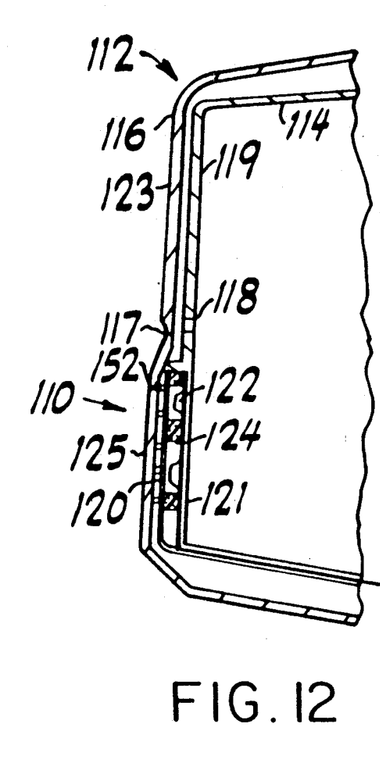
FIG. 12 is a cross-sectional view of the apparatus of FIG. 11, taken along the line 12—12 of FIG. 11.
Figure 14:
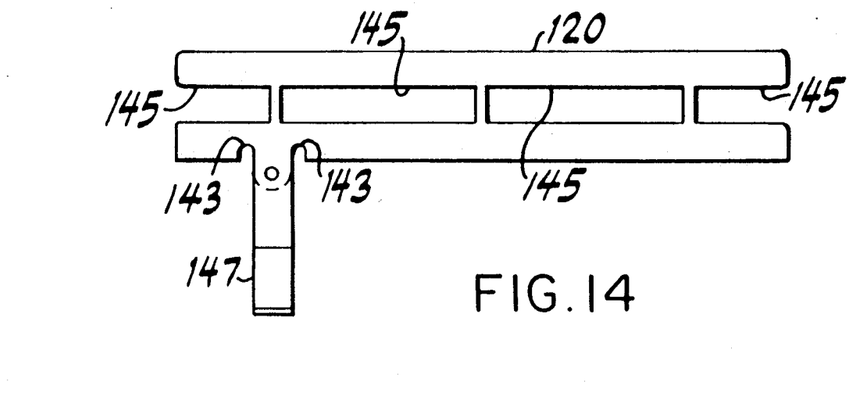
FIG. 14 is a top plan view of the upper contact of the apparatus of FIG. 11.

The horn switch assembly 110 is located within the bottom central portions 121 and 125 of the inner cover 114 and outer cover 116, respectively, as shown in FIGS. 11 and 12. The horn switch assembly 110 differs from the horn switch assembly 10 in that the upper contact 120 is coupled to the inner cover 114. As illustrated in FIG. 14, the upper contact 120 is a substantially flat sheet having a generally rectangular periphery. Several apertures 145 extend through the upper contact 120 along its approximate longitudinal axis. The apertures 145 are provided to give the upper contact 120 flexibility for contacting the lower contact 122, as described further below.

A male contact member 147 projects outwardly from one side of the upper contact 120, and is provided to electrically couple the upper contact 120 to the other components of the horn circuit (not shown), in a manner known to those skilled in the art. Relief apertures 143 extend inwardly through the upper contact 120 on each side of the base of the male contact member 147. The relief apertures 143 facilitate the flexion of the upper contact 120. The upper contact 120 is made from a sheet of phosphor bronze, approximately 0.005 inches thick.

Figure 13:
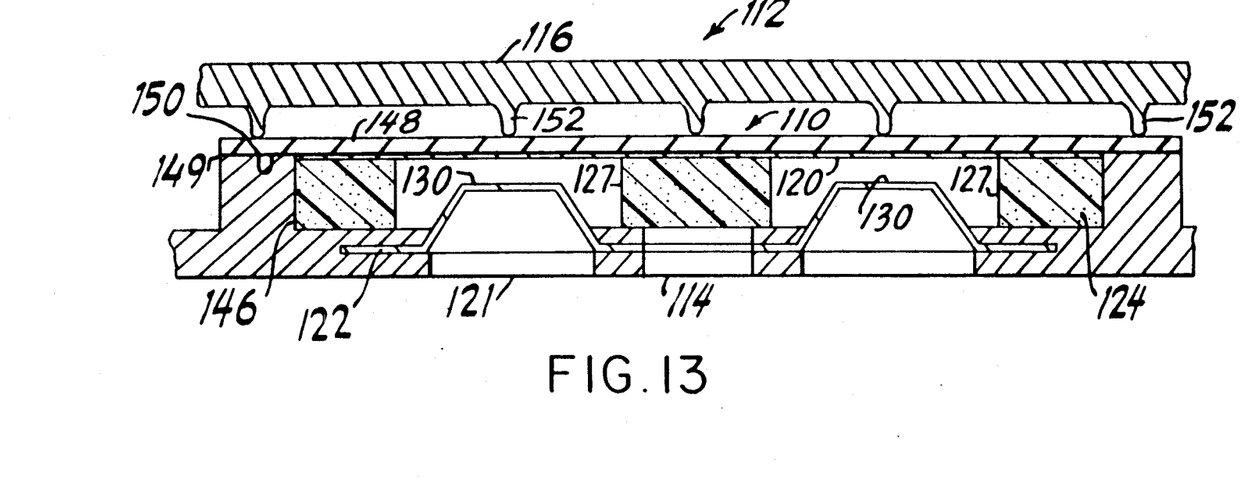
FIG. 13 is a magnified, partial cross-sectional view of the apparatus of FIG. 11, taken along the line 13—13 of FIG. 11.

As shown in FIG. 13, the inner cover 114 defines in a top surface 149 thereof a recess 146. The recess 146 is dimensioned to receive the urethane foam insulator 124. The top surface of the foam insulator 124 substantially coincides with the top surface 149.

A rubber membrane 148 is seated on the top surface 149 and covers the recess 146. The rubber membrane 148 is made of a rubber-like thermoplastic, such as Texin TM or Krayton TM, and has an adhesive backing 150 on the bottom surface thereof. The upper contact 120 is, in turn, sandwiched between the rubber membrane 148 and the urethane foam insulator 124. The adhesive backing 150 securely couples the upper contact 120 to the rubber membrane 148. The adhesive backing 150 also securely couples the rubber membrane 148 to the top surface 149 of the inner cover 114, outside the peripheral boundary of the recess 146. The upper contact 120 is, accordingly, securely coupled to the inner cover 114 by the rubber member 148 and the adhesive backing 150 thereof. The outer cover 116 also includes a plurality of nodes 152 projecting downwardly from the bottom surface thereof. The nodes 152 rest upon the top surface of the rubber membrane 148.

In the operation of the apparatus of the present invention, the horn switch assembly 110 is operated by depressing the outer cover 116 which, in turn, causes the nodes 152 to depress the rubber membrane 148. The rubber membrane 148 in turn urges the upper contact 120 into contact with the raised portions 130 of the lower contact 122, within the apertures 127 of the insulator 124. When the raised portions 130 contact the upper contact 120, the horn circuit (not shown) is closed and electric current is permitted to pass therethrough to operate the horn. Then, once the outer cover 116 is released, the foam insulator 124 pushes the upper contact 120 upwardly, and back into the position shown in FIG. 13.

Because both the upper contact 120 and the lower contact 122 are securely coupled to the bottom central portion 121 of the inner cover 114, when the airbag (not shown) is deployed, the risk of any components of the horn switch assembly 110 being forced loose by the airbag and striking a passenger in the vehicle is avoided. When the airbag is deployed, the bottom central portions 121 and 125 of the inner cover 114 and the outer cover 116, respectively, each open outwardly along the perforated sections 118 and seam 117, respectively, to permit the airbag to pass therethrough. However, the bottom central portions 121 and 125 are maintained securely coupled to the other portions of the inner cover 114 and outer cover 116, respectively. Thus, the components of the horn switch assembly 110 remain securely coupled to the inner cover 114. As a result, the risk of any components of the horn switch assembly 110 striking a passenger in the vehicle upon the deployment of the airbag, is avoided.

Another advantage of the apparatus of the present invention, is that because the horn switch assembly 110 is securely coupled to only the inner cover 114, the switch can be tested before the outer cover 116 is fitted over the inner cover 114. Therefore, as will be appreciated by those skilled in the art, the manufacturing and testing procedures of the apparatus are facilitated.

It should also be pointed out that the method of supporting the components of the of the apparatus of the present invention within the airbag module is equally applicable for supporting other vehicle components therein. For example, the components of a vehicle cruise control system, such as a printed circuit board, can be safely mounted within the airbag module, without the risk of such components being forced loose and, in turn, striking a passenger in the vehicle when the airbag is deployed.

Accordingly, based on the disclosure of the present invention provided herein, it would be within the knowledge of a person of ordinary skill in the art to integrally couple the printed circuit board to the inner cover and/or outer cover of the airbag module, in substantially the same way as the upper and/or lower contacts of the horn switch assembly of the apparatus of the present invention are coupled thereto. Accordingly, the printed circuit board (or similar component) can be supported so that it is not forced loose and, thus, does not strike and injure a passenger when the airbag is deployed.

I claim:

1. An apparatus for operating a motor vehicle horn, wherein the motor vehicle has a driver side airbag supported within the steering wheel, comprising:

an airbag module including an inner cover supported above the hub of the steering wheel for receiving the driver side airbag and including a first release portion which opens outwardly when the airbag is deployed to permit the airbag to pass therethrough, and remains coupled to the other portions of the inner cover to prevent any portions thereof from striking a passenger in the vehicle when the airbag is deployed, the airbag module further including an outer cover fitted over the inner cover and including a flexible wall for urging toward the inner cover, the flexible wall including a second release portion which opens outwardly when the airbag is deployed, to permit the airbag to pass therethrough and remains coupled to the other portions of the outer cover to prevent any portions thereof from striking a passenger in the vehicle when the airbag is deployed;

a first contact coupled to the first release portion of the inner cover, the first contact thus being prevented from being forced loose and, in turn, striking a passenger in the vehicle when the airbag is deployed; and a second contact coupled to the second release portion of the outer cover, the second contact thus remaining securely supported when the airbag is deployed to avoid striking a passenger in the vehicle, the second contact being spaced apart from the first contact for contacting the first contact upon the flexible wall of the outer cover being urged toward the inner cover, to actuate the horn switch and, in turn, operate the horn.

2. An apparatus as defined in claim 1, wherein:
the first contact is integrally coupled to the inner cover and includes a plurality of first contact portions projecting outwardly therefrom for contacting the second contact upon the flexible wall being urged toward the inner cover.

3. An apparatus as defined in claim 2, wherein:
the second contact is integrally coupled to the flexible wall of the outer cover and includes a plurality of second contact portions spaced away from and facing the first contact portions for contacting the first contact portions upon the flexible wall being urged toward the inner cover.

4. An apparatus as defined in claim 3, wherein:
the second contact includes a plurality of second lobes projecting outwardly from either side thereof to integrally couple the second contact to the outer cover, and
a plurality of second raised portions, each second raised portion defining a respective second contact portion on a surface thereof.

5. An apparatus as defined in claim 4, wherein:
the outer cover includes a plastic material, the second contact includes metal, and each second lobe defines at least one third aperture extending therethrough to permit the plastic material of the outer cover to flow through the third apertures upon the molding of the outer cover, to integrally couple the second contact to the outer cover.

6. An apparatus as defined in claim 2, further comprising:
a resilient insulating member supported between the first contact and the second contact to electrically insulate them from each other, the insulating member being squeezed upon the flexible wall being urged toward the inner cover to permit the second contact portions to contact the first contact portions.

7. An apparatus as defined in claim 6, wherein:
the resilient insulating member defines a plurality of first apertures extending therethrough, each first aperture being located between a respective first contact portion and second contact portion to permit the contact portions to contact each other therein.

8. An apparatus as defined in claim 2, wherein:
the inner cover includes a plastic material, the first contact includes metal, and the first contact is molded as an integral part of the inner cover, and the first contact is located so that the first contact portions extend in the direction of the outer cover.

9. An apparatus as defined in claim 8, wherein:
the first contact includes a plurality of first lobes projecting outwardly from either side thereof to integrally couple the first contact to the inner cover upon the molding thereof, and the first contact further includes a plurality of first raised portions, each first raised portion defining a respective first contact portion on a surface thereof.

10. An apparatus as defined in claim 9, wherein:
each first lobe defines at least one second aperture extending therethrough for permitting the plastic material of the inner cover to flow therethrough upon the molding of the inner cover, to integrally couple the first contact to the inner cover.

11. A horn switch assembly for a vehicle having a driver side airbag, the horn switch assembly being supported on an airbag module mounted above the hub of the vehicle's steering wheel, the airbag module including an inner cover for receiving the driver side airbag, and an outer cover supported above and covering the inner cover, wherein upon deployment of the airbag, the inner cover and the outer cover open to permit the airbag to pass therethrough, the horn switch assembly comprising:
- a lower contact including first contact portions, the lower contact being coupled to the inner cover such that when the inner cover opens when the airbag is deployed, the lower contact remains securely coupled thereto to avoid the risk of striking a passenger in the vehicle; and
- an upper contact including second contact portions, the upper contact being securely coupled to the outer cover, such that when the outer cover opens when the airbag is deployed, the upper contact remains securely supported by the outer cover to avoid the risk of striking a passenger in the vehicle, the upper contact being spaced apart from the lower contact to permit the second contact portions to contact the first contact portions upon the outer cover being urged toward the inner cover to actuate the horn switch and, in turn, operate the horn.

12. A horn switch assembly as defined in claim 11, wherein:
- the upper contact is integrally coupled to the outer cover and oriented so that the second contact portions are spaced away from and facing the first contact portions; and
- the lower contact is integrally coupled to the inner cover and oriented so that the first contact portions are spaced away from and facing the second contact portions.

13. A horn switch assembly as defined in claim 12, wherein:
- the lower contact includes a plurality a first raised portions, each first raised portion defining a respective first contact portion on a surface thereof; and
- the upper contact includes a plurality of second raised portions, each second raised portion defining a respective second contact portion on a surface thereof.

14. A horn switch assembly as defined in claim 13, further comprising:
- an insulating member supported between the upper contact and the lower contact and electrically insulating one from the other, the insulating member defining a plurality of first apertures extending therethrough, each first aperture being located between a respective first contact portion and second contact portion to permit the contact portions to contact each other therein.

15. A horn switch assembly as defined in claim 12, wherein:
- the outer cover includes plastic and the upper contact is molded as an integral part thereof; and
- the inner cover includes plastic and the lower contact is molded as an integral part thereof.

16. A horn switch assembly as defined in claim 15, wherein:
- the upper contact includes a plurality of first lobes and a plurality of second apertures extending through first lobes, the first lobes and second apertures being provided to integrally couple the upper contact to the outer cover upon the molding of the outer cover; and
- the lower contact includes a plurality of second lobes and a plurality of third apertures extending through second lobes, the second lobes and third apertures being provided to integrally couple the lower contact to the inner cover upon the molding of the inner cover.

17. A motor vehicle driver side airbag module for supporting electrical components, comprising:
- an airbag housing supported above the hub of the steering wheel, the airbag housing being molded of a plastic material for receiving a driver side airbag, the airbag housing including a first release portion in a top wall thereof which opens outwardly when the airbag is deployed to permit the airbag to pass therethrough, and remains securely coupled to the other portions of the airbag housing to avoid striking any passengers in the vehicle;
- a cover molded of a flexible plastic material and shaped to be securely fitted over the airbag housing, the cover including a second release portion located approximately above the first release portion of the airbag housing which opens outwardly when the airbag is deployed to permit the airbag to pass therethrough, and remains securely coupled to the other portions of the cover to avoid striking any passengers in the vehicle; and
- a first electrical component molded as an integral part of the first release portion of the airbag housing, the first electrical component thus remaining securely coupled to the first release portion when the airbag is deployed to avoid striking any passengers in the vehicle.

18. A motor vehicle driver side airbag module as defined in claim 17, further comprising:
- a second electrical component coupled to the first release portion of the airbag housing and spaced above the first electrical component for contacting the first electrical component upon urging the cover toward the airbag housing.

19. A motor vehicle driver side airbag module as defined in claim 18, wherein the first and second electrical components are the first and second contacts, respectively, for the motor vehicle horn switch assembly.

20. A motor vehicle driver side airbag module as defined in claim 17, further comprising:
- a second electrical component molded as an integral part of the second release portion of the cover, the second electrical component thus remaining securely coupled to the second release portion when the airbag is deployed, to avoid striking any passengers in the vehicle.

21. A motor vehicle d side airbag module as defined in claim 20, wherein:
- the first electrical component is the lower contact of a vehicle horn switch; and
- the second electrical component is the upper contact of a vehicle horn switch, the upper contact being spaced above the lower contact to contact the lower contact to actuate the horn switch and, in turn, operate the horn, by depressing the second release portion of the cover toward the first release portion of the airbag housing.

22. A motor vehicle driver side airbag module as defined in claim 20, further comprising:
- an insulating member supported between the upper contact and the lower contact and defining a plurality of apertures extending therethrough; and
- the lower contact includes a plurality of lower contact portions projecting upwardly therefrom, and the upper contact includes a plurality of upper contact portions projecting downwardly therefrom, the apertures of the insulating member being located between respective upper and lower contact portions to permit them to contact each other therein to actuate the horn switch.

23. An apparatus for operating a motor vehicle horn, wherein the motor vehicle has a driver side airbag supported within the steering wheel, comprising:

an airbag module including an inner cover supported above the hub of the steering wheel for receiving the driver side airbag and including a first release portion which opens outwardly when the airbag is deployed to permit the airbag to pass therethrough, and remains coupled to the other portions of the inner cover to prevent any portions thereof from striking a passenger in the vehicle when the airbag is deployed, the airbag module further including an outer cover fitted over the inner cover and including a flexible wall for urging toward the inner cover, the flexible wall including a second release portion which opens outwardly when the airbag is deployed to permit the airbag to pass therethrough and remains coupled to the other portions of the outer cover to prevent any portions thereof from striking a passenger in the vehicle when the airbag is deployed;

a first contact coupled to the first release portion of the inner cover to prevent the first contact from being forced loose and striking a passenger in the vehicle when the airbag is deployed; and a second contact coupled to the first release portion of the inner cover to prevent the second contact from being forced loose and striking a passenger in the vehicle when the airbag is deployed, the second contact being spaced apart from the first contact for contacting the first contact upon the flexible wall of outer cover being urged toward the inner cover to actuate the horn switch and, in turn, operate the horn.

24. An apparatus as defined in claim 23, further comprising:

a flexible membrane extending across a surface of the inner cover facing the outer cover and coupled thereto, the second contact being coupled to a surface of the flexible membrane facing the inner cover and spaced away from the first contact; and a resilient insulating member seated within a recess defined within the inner cover, the first contact being integrally coupled to the inner cover within the recess and oriented so that the first contact portions face the second contact, the insulating member being located between the first contact and the second contact to electrically insulate them from each other, and including a plurality of insulator apertures extending therethrough to permit the first contact to contact the second contact therein upon the flexible wall of the outer cover being urged toward the inner cover.

25. An apparatus as defined in claim 24, wherein the flexible membrane includes an adhesive on a surface thereof facing the inner cover, the adhesive being provided to couple the flexible membrane to the first surface of the inner cover, and to couple the second contact to the flexible membrane.

26. An apparatus as defined in claim 24, wherein:
the first contact includes a plurality of first lobes to integrally couple the first contact to the inner cover upon the molding of the inner cover, and the first contact includes a plurality of first raised portions, each first raised portion defining a respective first contact portion on a surface thereof; and
the second contact includes a substantially flat, flexible surface for coupling to the flexible membrane.

27. A horn switch assembly for a vehicle having a driver side airbag, the horn switch assembly being supported on an airbag module mounted above the hub of the vehicle's steering wheel, the airbag module including an inner cover for receiving the driver side airbag, and an outer cover supported above and covering the inner cover, wherein upon deployment of the airbag, the inner cover and the outer cover open to permit the airbag to pass therethrough, the horn switch assembly comprising:

a lower contact including first contact portions coupled to the inner cover for remaining securely coupled to the inner cover upon deployment of the airbag to avoid the risk of striking a passenger in the vehicle; and an upper contact including second contact portions coupled to the inner cover for remaining securely coupled to the inner cover upon deployment of the airbag to avoid the risk of striking a passenger in the vehicle, the upper contact being spaced apart from the lower contact to permit the second contact portions to contact the first contact portions upon the outer cover being urged toward the inner cover to actuate the horn switch.

28. A horn switch assembly as defined in claim 27, wherein:
the lower contact is integrally coupled to the inner cover within a recess defined in a surface thereof facing the outer cover; and
the upper contact is securely coupled to the inner cover, the upper contact being spaced above the lower contact and located between the outer cover and the lower contact.

29. A horn switch assembly as defined in claim 28, further comprising:
an insulating member supported within the recess between the upper contact and the lower contact to electrically insulate the two contacts from each other, the insulating member defining a plurality of first apertures extending therethrough to permit the first contact portions to contact the second contact portions therein.

30. A horn switch assembly as defined in claim 28, further comprising:
an upper contact support member securely coupled to the inner cover and to the upper contact, the support member being located between the upper contact and the outer cover and extending over the recess in the inner cover.

31. A horn switch assembly as defined in claim 30, wherein
the upper contact support member includes an adhesive on a surface thereof, the adhesive being provided to couple the support member to the inner cover and the upper contact to the support member.

32. A motor vehicle driver side airbag module comprising:
an airbag housing for supporting on the hub of the steering wheel of the vehicle for receiving the airbag;
a cover molded of a flexible plastic material and shaped to be securely fitted over the airbag housing, the cover including a release portion located above the airbag for release upon deployment of the airbag to permit the airbag to pass through the cover and for remaining coupled to the other portions of the cover to avoid striking a passenger in the vehicle;

a first contact of a motor vehicle horn switch coupled to the release portion of the cover for remaining securely coupled to the cover upon deployment of the airbag to avoid striking a passenger in the vehicle; and a second contact of the motor vehicle horn switch coupled to the release portion of the cover for remaining securely coupled to the cover upon deployment of the airbag to avoid striking a passenger in the vehicle and spaced apart from the first contact for contacting the first contact upon depressing the flexible cover to actuate the horn switch.

33. A motor vehicle driver side airbag module as defined in 32, wherein the cover defines a recess for receiving the first contact which is integrally coupled to the cover within the recess, and a flexible membrane extends across the recess and is coupled to the cover, and the second contact is coupled to the flexible membrane for actuating the horn switch upon depressing the flexible membrane toward the first contact.

34. A motor vehicle driver side airbag module as defined in claim 33, further comprising a flexible insulating member supported between the first and second contacts and including at least one aperture for permitting the first contact to contact the second contact upon depressing the flexible membrane to actuate the horn switch.

* * * * *